(12) United States Patent
Berta et al.

(10) Patent No.: US 8,058,350 B2
(45) Date of Patent: Nov. 15, 2011

(54) POLYPROPYLENE COMPOSITION

(75) Inventors: Dominic A. Berta, Newark, DE (US); Giampaolo Pellegatti, Baura (IT)

(73) Assignee: Basell Poliolefine Italia, s.r.l., Milan (IT)

( * ) Notice: Subject to any disclaimer, the term of this patent is extended or adjusted under 35 U.S.C. 154(b) by 609 days.

(21) Appl. No.: 10/577,270

(22) PCT Filed: Nov. 3, 2004

(86) PCT No.: PCT/IB2004/003584
§ 371 (c)(1),
(2), (4) Date: Apr. 26, 2006

(87) PCT Pub. No.: WO2005/044911
PCT Pub. Date: May 19, 2005

(65) Prior Publication Data
US 2007/0078224 A1    Apr. 5, 2007

Related U.S. Application Data

(60) Provisional application No. 60/518,449, filed on Nov. 6, 2003.

(51) Int. Cl.
*C08L 23/00* (2006.01)
*C08L 23/04* (2006.01)
*C08L 23/10* (2006.01)

(52) U.S. Cl. ........................ 525/240; 525/191

(58) Field of Classification Search ............. 525/240, 525/88, 191; 524/528; 1/240, 88, 191
See application file for complete search history.

(56) References Cited

U.S. PATENT DOCUMENTS

| | | | |
|---|---|---|---|
| 3,515,775 A | 6/1970 | Combs et al. | |
| 4,128,606 A | 12/1978 | Furutachi et al. | |
| 4,143,099 A | 3/1979 | Duncan | |
| 4,220,579 A | 9/1980 | Rinehart | |
| 4,298,718 A | 11/1981 | Mayr et al. | 526/125 |
| 4,313,867 A | 2/1982 | Duvdevani | |
| 4,316,966 A | 2/1982 | Mineshima et al. | |
| 4,399,054 A | 8/1983 | Ferraris et al. | |
| 4,480,065 A | 10/1984 | Kawai et al. | |
| 4,495,338 A | 1/1985 | Mayr et al. | 526/125 |
| 4,705,818 A | 11/1987 | Kawai et al. | |
| 4,734,459 A | 3/1988 | Cecchin et al. | |
| 4,857,613 A | 8/1989 | Zolk et al. | |
| 4,871,796 A | 10/1989 | Komatsu et al. | |
| 5,055,528 A | 10/1991 | Kioka et al. | |
| 5,115,030 A * | 5/1992 | Tanaka et al. | 525/240 |
| 5,145,819 A | 9/1992 | Winter et al. | 502/117 |
| 5,155,030 A | 10/1992 | Nakamura et al. | |
| 5,239,022 A | 8/1993 | Winter et al. | 526/127 |
| 5,243,001 A | 9/1993 | Winter et al. | 526/127 |
| 5,288,824 A | 2/1994 | Kerth et al. | |
| 5,324,800 A | 6/1994 | Welborn, Jr. et al. | 526/160 |
| 5,480,972 A | 1/1996 | Avjioglu et al. | |
| 5,536,789 A | 7/1996 | Schwager et al. | |
| 5,541,260 A | 7/1996 | Pelliconi et al. | |
| 5,556,928 A | 9/1996 | Devore et al. | 526/127 |
| 5,747,592 A | 5/1998 | Huff et al. | |
| 5,763,534 A | 6/1998 | Srinivasan et al. | |
| 5,824,400 A | 10/1998 | Petrakis et al. | |
| 6,054,406 A | 4/2000 | Smith | |
| 6,191,223 B1 | 2/2001 | Dolle et al. | |
| 6,214,934 B1 | 4/2001 | Moriya et al. | |
| 6,395,832 B1 | 5/2002 | Pelliconi et al. | |
| 6,429,250 B1 | 8/2002 | Rohrmann | |
| 6,506,842 B1 | 1/2003 | Heck et al. | |
| 6,953,829 B2 | 10/2005 | Kratzer et al. | |
| 7,101,940 B2 | 9/2006 | Schottek et al. | |
| 7,122,606 B2 | 10/2006 | Tonti et al. | |
| 2003/0008984 A1 | 1/2003 | Schottek et al. | 564/8 |
| 2003/0013913 A1 | 1/2003 | Schottek et al. | 564/8 |
| 2004/0010087 A1 | 1/2004 | Obata et al. | |
| 2005/0272874 A1 | 12/2005 | Pelliconi et al. | |
| 2006/0041072 A1 | 2/2006 | Pelliconi et al. | |
| 2006/0047071 A1 * | 3/2006 | Pelliconi et al. | 525/191 |
| 2008/0071019 A1 | 3/2008 | Pelliconi et al. | |

FOREIGN PATENT DOCUMENTS

| | | |
|---|---|---|
| DE | 3319619 | 12/1983 |
| DE | 4019053 | 12/1991 |
| DE | 4211413 | 10/1993 |
| DE | 19962814 | 6/2001 |
| DE | 19962910 | 7/2001 |
| DE | 19962814 | 1/2003 |
| DE | 19962910 | 1/2003 |
| EP | 9276 | 4/1980 |
| EP | 45975 | 2/1982 |
| EP | 45977 | 2/1982 |
| EP | 86473 | 8/1983 |
| EP | 170255 | 2/1986 |
| EP | 323715 | 7/1989 |
| EP | 353981 | 2/1990 |
| EP | 361493 | 4/1990 |
| EP | 361494 | 4/1990 |

(Continued)

OTHER PUBLICATIONS

M. Kakugo et al., *Macromolecules*, vol. 15, p. 1150-1152 (1982).
J. C. Randall, JMS-REV *Macromol Chem. Phys.*, C29 (2&3), 201-317 (1989).
J. C. Randall, "Polymer Sequence Determination Carbon 13 NMR Method," Academic Press (1977).
Moor, E.P., Jr. et al., "Polypropylene Handbook", Kogyo Chosakai Co.Ltd., pp. 71-74 (1998). (Partial translation included).

*Primary Examiner* — Irina S Zemel
*Assistant Examiner* — Jeffrey Lenihan
(74) *Attorney, Agent, or Firm* — Dilworth IP, LLC

(57) ABSTRACT

A composition comprising: a) 50% to 90% of a propylene (co)polymer having: (i) a polydispersity index >3, (ii) melt flow rate >1 dg/min, and (iii) fraction soluble in xylene at 25° C. >1%, b) 5% to 25% of an ethylene/α-olefin copolymer having: (i) ethylene content over 50% but under 92% by mol, (ii) intrinsic viscosity over 1.2 but under 6 dL/g, (iii) density ranging from 0.850 to 0.890 g/cm$^3$, and (iv) enthalpy of fusion under 62 J/g; c) 5% to 25% of a propylene/ethylene copolymer having: (i) propylene content over 50% but under 92% by mol, (ii) intrinsic viscosity over 2 but under 6 dL/g, (iii) density ranging from 0.850 to 0.890 g/cm$^3$, (iv) product of reactivity ratios r1×r2 under 2, and (v) enthalpy of fusion under 45 J/g; wherein the weight ratio between component b and the sum of components b) and c) is 0.5 to 0.9.

10 Claims, No Drawings

FOREIGN PATENT DOCUMENTS

| | | |
|---|---|---|
| EP | 362705 | 4/1990 |
| EP | 373660 | 6/1990 |
| EP | 395083 | 10/1990 |
| EP | 416815 | 3/1991 |
| EP | 420436 | 4/1991 |
| EP | 430490 | 6/1991 |
| EP | 451645 | 10/1991 |
| EP | 457082 | 11/1991 |
| EP | 463406 | 1/1992 |
| EP | 472946 | 3/1992 |
| EP | 476625 | 3/1992 |
| EP | 485820 | 5/1992 |
| EP | 485822 | 5/1992 |
| EP | 485823 | 5/1992 |
| EP | 496926 | 8/1992 |
| EP | 519725 | 12/1992 |
| EP | 553805 | 8/1993 |
| EP | 553806 | 8/1993 |
| EP | 573862 | 12/1993 |
| EP | 600246 | 6/1994 |
| EP | 602512 | 6/1994 |
| EP | 611801 | 8/1994 |
| EP | 633289 | 1/1995 |
| EP | 643066 | 3/1995 |
| EP | 671404 | 9/1995 |
| EP | 674991 | 10/1995 |
| EP | 692499 | 1/1996 |
| EP | 728769 | 8/1996 |
| EP | 782587 | 7/1997 |
| EP | 790076 | 8/1997 |
| EP | 792814 | 9/1997 |
| EP | 816395 | 1/1998 |
| EP | 831125 | 3/1998 |
| EP | 844279 | 5/1998 |
| EP | 844280 | 5/1998 |
| EP | 844281 | 5/1998 |
| EP | 936247 | 8/1999 |
| EP | 936248 | 8/1999 |
| EP | 1236769 | 9/2002 |
| EP | 0884353 B1 | 10/2002 |
| EP | 129368 | 12/2004 |
| JP | 01016848 | 1/1989 |
| JP | 11-60847 | 3/1999 |
| JP | 2002-513430 | 5/2002 |
| JP | 2003-10560 | 1/2003 |
| WO | 91/02012 | 2/1991 |
| WO | 91/04257 | 4/1991 |
| WO | 92/00333 | 1/1992 |
| WO | 92/22607 | 12/1992 |
| WO | 96/22327 | 7/1996 |
| WO | 96/22995 | 8/1996 |
| WO | 98/22486 | 5/1998 |
| WO | 98/37144 | 8/1998 |
| WO | 99/21899 | 5/1999 |
| WO | 99/24446 | 5/1999 |
| WO | 99/58539 | 11/1999 |
| WO | 00/26295 | 5/2000 |
| WO | 01/19915 | 3/2001 |
| WO | 01/21674 | 3/2001 |
| WO | 01/44318 | 6/2001 |
| WO | 01/47939 | 7/2001 |
| WO | 01/48034 | 7/2001 |
| WO | 01/62764 | 8/2001 |
| WO | 03/045964 | 6/2003 |
| WO | 03/051984 | 6/2003 |
| WO | 2004/003072 | 1/2004 |
| WO | 2004/003073 | 1/2004 |
| WO | 2005/014715 | 2/2005 |
| WO | 2005/044911 | 5/2005 |
| WO | 2005/121240 | 12/2005 |

\* cited by examiner

POLYPROPYLENE COMPOSITION

The present invention relates to a propylene polymer composition having improved impact-stiffness balance.

Because of their excellent rigidity, heat resistance and impact resistance propylene polymers are used for various molded articles in many fields. In order to improve some properties such as impact resistance and stiffness, propylene polymers are blended with various other polymers, such as rubbers, in order to obtain materials useful for various and different uses such as components for automotive.

EP 844 280 relates to a propylene resin composition comprising a polypropylene resin and a rubber component in specific proportions. The rubber component comprises an ethylene random copolymer and a propylene/1-butene random copolymer. Both polymers are obtained by using a metallocene catalyst component. The weight ratio between the ethylene random copolymer and the propylene/1-butene random copolymer is in comprised in the range 95/5 to 20/80.

EP 936 247 relates to a propylene resin composition comprising a polypropylene resin, an ethylene/alpha-olefin random copolymer and a propylene/ethylene/1-butene random copolymer. In particular the propylene/ethylene/1-butene random copolymer comprises 50-88 mole % of units derived from propylene, 2-30 mole % of units derived from ethylene and 10-40 mole % of units derived from 1-butene.

EP 816 395 discloses a process for preparing a propylene polymer composition comprising a first stage in which a propylene polymer is prepared, a second stage in which a propylene rubber is prepared and a third stage in which it is prepared an ethylene rubber. The three stages are carried out by using a metallocene-based catalyst. According to this document, the resulting composition has an excellent rigidity, heat resistance and impact resistance.

The applicant has surprisingly found that the impact-stiffness balance in a propylene polymer composition can be further improved.

An object of the present invention is a propylene polymer composition comprising the following components:

a) from 50% to 90% by weight of a propylene homopolymer or a propylene copolymer containing up to 5% by mol of derived units of $C_2$-$C_{20}$ alpha-olefins, having the following features:
  (i) a polydispersity index PI>3; preferably PI>3.5; more preferably PI>4;
  (ii) melt flow rate (MFR), as measured at 230° C. under a load of 2.16 kg, MFR>1 dg/min; and
  (iii) fraction soluble in xylene at 25° C. (XSRT)>1%
b) from 5% to 25% by weight a copolymer of ethylene and one or more derived units of $C_4$-$C_{20}$ alpha-olefins having the following features:
  (i) content of ethylene derived units higher than 50% by mol and lower than 92% by mol;
  (ii) intrinsic viscosity (IV) higher than 1.2 dL/g and lower than 6 dL/g;
  (iii) density ranging from 0.850 to 0.890 g/cm³; and
  (iv) a crystallinity content, expressed as the enthalpy of fusion, lower than 62 J/g
c) from 5% to 25% by weight of a copolymer of propylene and ethylene having the following features:
  (i) content of propylene derived units higher than 50% by mol and lower than 92% by mol;
  (ii) intrinsic viscosity (IV) higher than 2 dL/g and lower than 6 dL/g;
  (iii) density ranging from 0.850 to 0.890 g/cm3
  (iv) the value of the product of reactivity ratios r1×r2 lower than 2; and
  (v) a crystallinity content, expressed as the enthalpy of fusion, lower than 45 J/g wherein the weight ratio between the ethylene copolymer (component b) and the sum of component b) and component c) (propylene copolymer) is equal to or higher than 0.5 and less than or equal to 0.9.

In the propylene polymer component a) of the present invention preferably the 2,1 regioerrors are not detectable in a $^{13}C$ NMR spectrum recorded at a 300 MHz instrument. The melt flow rate (MFR), as measured at 230° C. under a load of 2.16 kg is preferably >20 dg/min; more preferably >50 dg/min; even more preferably >55 dg/min. The fraction soluble in xylene at 25° C. (XSRT) is preferably >1.5%, even more preferably >1.8%.

The propylene polymer component a) of the present invention can be prepared according to known technologies by polymerization of propylene, optionally with one or more comonomers selected from $C_2$-$C_{20}$ alpha-olefins, in the presence of conventional catalysts of the Ziegler/Natta type comprising the product of the reaction between an aluminium alkyl and a solid component comprising a transition metal supported on $MgCl_2$ in an active form. In particular, the best results are obtained when using catalysts comprising the product of the reaction between:

(i) a solid component comprising a titanium compound without Ti-π bonds and an electron donor compound (internal donor) supported on a magnesium halide in an active form;
(ii) an Al-alkyl compound and, if appropriate, an electron donor compound (external donor).

The use of an external electron donor compound is generally necessary to obtain propylene polymers having an isotacticity (mm) greater than 80. Nevertheless, if compounds of the type described in Patent EP-A-361,493 are used as internal electron donor compounds, the stereospecificity of the catalyst is by itself sufficiently high and it is not necessary to use an external electron donor compound.

The magnesium halides, preferably $MgCl_2$, in an active form used as support for Ziegler-Natta catalysts are widely known from the patent literature. The U.S. Pat. Nos. 4,298,718 and 4,495,338 described for the first time the use of these compounds in Ziegler-Natta catalysis. It is known from these patents that the magnesium halides used in the active form as support or co-support in catalyst components for the polymerization of olefins are characterized by X-ray spectra in which the most intense diffraction line appearing in the spectra of the inactive halide is reduced in intensity and replaced by a halo whose intensity maximum is displaced towards angles which are smaller with respect to that of the most intense line.

The titanium compound is preferably selected from the halides and halogeno-alcoholates.

Preferred titanium compounds are $TiCl_4$, $TiCl_3$ and the halogeno-alcoholates of the formula $Ti(OR^1)_m X_n$ in which $R^1$ is a hydrocarbon radical with 1-12 carbon atoms or a group $COR^1$, X is halogen and (m+n) is the valency of the titanium.

Advantageously, the catalytic component (i) is used in the form of spherical particles having an average diameter of between about 10 and 150 μm. Suitable methods for preparing the said components in a spherical form are described, for example, in the Patents EP-A-395,083, EP-A-553,805 and EP-A-553,806, the description of which, relating to the method of preparation and to the characteristics of the products, is incorporated herein by reference.

Suitable internal electron donor compounds include the ethers, esters and in particular the esters of polycarboxylic acids, the amines, the ketones and the 1,3-diethers of the type described in the Patents EP-A-361,493, EP-A-361,494, EP-A-362,705 and EP-A-451,645.

The Al-alkyl compound (ii) is preferably selected from the aluminium trialkyls, such as, for example, Al-triethyl, Al-triisobutyl, Al-tri-n-butyl, Al-tri-n-hexyl and Al-tri-n-octyl. Mixtures of Al-trialkyls with Al-alkyl halides, Al-alkyl hydrides or Al-alkyl sesquichlorides such as $AlEt_2Cl$ and $Al_2Et_3Cl_3$ may also be used.

The external donor can be of the same type as or can differ from the internal donor. If the internal donor is the ester of a polycarboxylic acid, in particular a phthalate, the external donor is preferably selected from the silicon compounds of the formula $R_1R_2Si(OR)_2$, where $R_1$ and $R_2$ are alkyl, cycloalkyl or aryl radicals having 1-18 carbon atoms. Examples of such silanes are methyl-cyclohexyl-dimethoxy-silane, diphenyl-dimethoxy-silane, methyl-t-butyl-dimethoxy-silane and dicyclopentyl-dimethoxy-silane.

Component b) of the composition of the present invention is a copolymer of ethylene and one or more derived units of $C_4$-$C_{20}$ alpha-olefins having the following features:
(i) content of ethylene derived units higher than 50% by mol and lower than 92% by mol;
(ii) intrinsic viscosity (IV) higher than 1.2 dL/g and lower than 6 dL/g;
(iii) density ranging from 0.850 to 0.890 g/cm³
(iv) a crystallinity content, expressed as the enthalpy of fusion, lower than 62 J/g The content of derived units of $C_4$-$C_{20}$ alpha-olefins preferably ranges from 5% to 40% by mol, more preferably from 10% to 30% by mol.

The intrinsic viscosity (IV) is preferably higher than 1.25 dL/g and lower than 3.0 dL/g more preferably it is higher than 1.28 dL/g and lower than 2.8 dL/g.

The enthalpy of fusion is preferably lower than 50 J/g; more preferably it is lower than 30 J/g; even more preferably it is lower than lower than 25 J/g.

Preferably component b) is endowed with a value of the product of reactivity ratios r1×r2 lower than 5; preferably lower than 4.

Examples of $C_2$-$C_{20}$ alpha-olefins that can be used as comonomers are: 1-butene, 1-pentene, 4-methyl-1-pentene, 1-hexene, 1-octene, 4,6-dimethyl-1-heptene, 1-decene, 1-dodecene, 1-tetradecene, 1-hexadecene, 1-octadecene and 1-eicosene. Preferred comonomers are 1-butene and 1-octene.

The product of the reactivity ratios $r_1 \cdot r_2$ are calculated according to the following formula:

$$r_1 \times r_2 = 4[EE][OO]/[EO]^2$$

wherein [EE] and [OO] represent the mole fractions of the ethylene units and the alpha-olefin units, respectively, in the ethylene copolymer and [EO] is a proportion of number of ethylene/alpha-olefin alternating chains in the total number of dyad chains.

The values of EE, OO and OE can be determined by a $^{13}$C-NMR spectrum recorded at a 300 MHz instrument according to M. Kakugo, Y. Naito, K. Mizunuma, and Macromolecules 1982, 15, 1150-1152 and J. C. Randall JMS-REV. Macromol. Chem. Phys., C29 (2&3), 201-317 (1989).

These ethylene copolymers are obtainable by polymerizing ethylene and one or more alpha olefins in the presence of a metallocene compound having at least one cyclopentadienyl moiety which is π-bonded to the central metal.

Component c) of the composition of the present invention is a copolymer of propylene and ethylene having the following features:
(i) content of propylene derived units higher than 50% by mol and lower than 92% by mol;
(ii) intrinsic viscosity (IV) higher than 2 dL/g and lower than 6 dL/g;
(iii) density ranging from 0.850 to 0.890 g/cm3
(iv) the value of the product of reactivity ratios r1×r2 is lower than 2;
(v) a crystallinity content, expressed as the enthalpy of fusion, lower than 45 J/g The content of propylene derived units preferably ranges from 50% by mol to 80% by mol; more preferably from 60% by mol from 75% by mol.

The content of ethylene derived units in the component c) is lower than 50% by mol, preferably it ranges from 50% by mol to 20% by mol; more preferably it ranges from 40% by mol to 15% by mol.

The intrinsic viscosity is preferably higher than 2 dL/g and lower than 4 dL/g, more preferably it is higher than 2 dL/g and lower than 3 dL/g.

The enthalpy of fusion is preferably lower than 35 J/g; more preferably it is lower than 30 J/g.

The value of the product of reactivity ratios r1×r2 is preferably lower than 1.8; more preferably it is lower than 1.6.

These propylene/ethylene copolymers are obtainable by polymerizing propylene and ethylene in the presence of a metallocene compound having at least one cyclopentadienyl moiety which is π-bonded to the central metal.

The value of the product of reactivity ratios r1×r2 can be calculated according to the following equation.

$$r_1 \times r_2 = 4[PP][EE]/[PE]^2$$

wherein [PP] and [EE] represent the mole fractions of the propylene units and the ethylene units, respectively, in the propylene/ethylene copolymer and [PE] is a proportion of number of propylene/ethylene alternating chains in the total number of dyad chains.

The values of [PP], [EE] and [PE] can be determined by a $^{13}$C-NMR spectrum recorded at a 300 MHz instrument according to M. Kakugo, Y. Naito, K. Mizunuma, Macromolecules 1982, 15, 1150-1152 and J. C. Randall JMS-REV. Macromol. Chem. Phys., C29 (2&3), 201-317 (1989).

Preferably the weight ratio between the ethylene copolymer (component b) and the sum of component b and component c (propylene copolymer) is comprised between 0.55 and 0.85 more preferably between 0.60 and 0.80.

Preferably the composition of the present invention contains from 50% to 80% by weight of a propylene polymer component a), from 25% to 9% by weight of component b) and from 25% to 11% by weight of component c).

A preferred class of metallocene compounds that can be used for obtaining component b) and c) of the composition of the present invention are those belonging to the following formulas (I), (II) or (III):

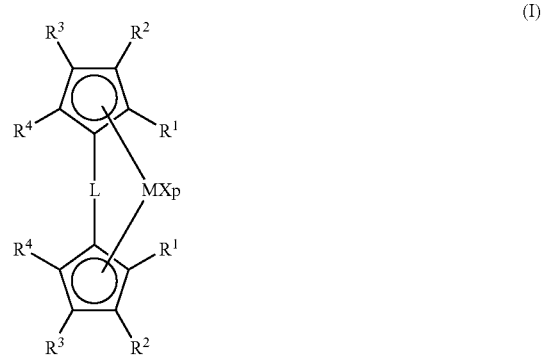

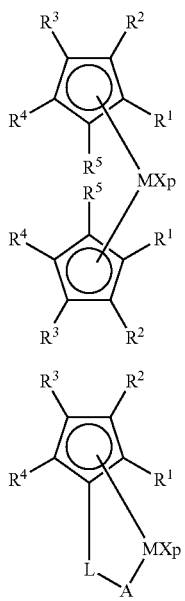

wherein

M is a transition metal belonging to group 4, 5 or to the lanthanide or actinide groups of the Periodic Table of the Elements; preferably M is zirconium, titanium or hafnium;

the substituents X, equal to or different from each other, are monoanionic sigma ligands selected from the group consisting of hydrogen, halogen, $R^6$, $OR^6$, $OCOR^6$, $SR^6$, $NR^6_2$ and $PR^6_2$, wherein $R^6$ is a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl group, optionally containing one or more Si or Ge atoms; or two X can optionally form a substituted or unsubstituted butadienyl radical or a OR'O group wherein R' is a divalent radical selected from $C_1$-$C_{20}$ alkylidene, $C_6$-$C_{40}$ arylidene, $C_7$-$C_{40}$ alkylarylidene and $C_7$-$C_{40}$ arylalkylidene radicals; the substituents X are preferably the same and are preferably $R^6$, $OR^6$ and $NR^6_2$; wherein $R^6$ is preferably a $C_1$-$C_7$ alkyl, $C_6$-$C_{14}$ aryl or $C_7$-$C_{14}$ arylalkyl group, optionally containing one or more Si or Ge atoms; more preferably, the substituents X are selected from the group consisting of —Cl, —Br, -Me, -Et, -n-Bu, -sec-Bu, -Ph, -Bz, —CH₂SiMe₃, —OEt, —OPr, —OBu, —OBz and —NMe₂;

p is an integer equal to the oxidation state of the metal M minus 2;

L is a divalent bridging group selected from $C_1$-$C_{20}$ alkylidene, $C_3$-$C_{20}$ cycloalkylidene, $C_6$-$C_{20}$ arylidene, $C_7$-$C_{20}$ alkylarylidene, or $C_7$-$C_{20}$ arylalkylidene radicals optionally containing heteroatoms belonging to groups 13-17 of the Periodic Table of the Elements, and silylidene radical containing up to 5 silicon atoms such as SiMe₂, SiPh₂; preferably L is a divalent group $(ZR^7_m)_n$; Z being C, Si, Ge, N or P, and the $R^7$ groups, equal to or different from each other, being hydrogen or linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl groups or two $R^7$ can form a aliphatic or aromatic $C_4$-$C_7$ ring;

m is 1 or 2, and more specifically it is 1 when Z is N or P, and it is 2 when Z is C, Si or Ge; n is an integer ranging from 1 to 4; preferably n is 1 or 2;

more preferably L is selected from Si(CH₃)₂, SiPh₂, SiPhMe, SiMe(SiMe₃), CH₂, (CH₂)₂, (CH₂)₃ or C(CH₃)₂;

$R^1$, $R^2$, $R^3$, $R^4$ and $R^5$, equal to or different from each other, are hydrogen atoms, halogen atoms or linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl, or $C_7$-$C_{20}$-arylalkyl radicals, optionally containing one or more heteroatoms belonging to groups 13-17 of the Periodic Table of the Elements; or two adjacent $R^1$, $R^2$, $R^3$, $R^4$ and $R^5$ form one or more 3-7 membered ring optional containing heteroatoms belonging to groups 13-17 of the periodic table; such as to form with the cyclopentadienyl moiety, for example, the following radicals: indenyl; mono-, di-, tri- and tetra-methyl indenyl; 2-methyl indenyl, 3-ᵗbutyl-indenyl, 2-isopropyli-4-phenyl indenyl, 2-methyl-4-phenyl indenyl, 2-methyl-4,5benzo indenyl; 3-trimethylsilyl-indenyl; 4,5,6,7-tetrahydroindenyl; fluorenyl; 5,10-dihydroindeno[1,2-b]indol-10-yl; N-methyl- or N-phenyl-5,10-dihydroindeno[1,2-b]indol-10-yl; 5,6-dihydroindeno[2,1-b]indol-6-yl; N-methyl- or N-phenyl-5,6-dihydroindeno[2,1-b]indol-6-yl; azapentalene-4-yl; thiapentalene-4-yl; azapentalene-6-yl; thiapentalene-6-yl;

mono-, di- and tri-methyl-azapentalene-4-yl, 2,5-dimethyl-cyclopenta[1,2-b:4,3-b']-dithiophene.

Non limiting examples of compounds belonging to formula (I) (II) and (III) are the following compounds (when possible in either their meso or racemic isomers, or mixtures thereof):

bis(cyclopentadienyl)zirconium dichloride;
bis(indenyl)zirconium dichloride;
bis(tetrahydroindenyl)zirconium dichloride;
bis(fluorenyl)zirconium dichloride;
(cyclopentadienyl)(indenyl)zirconium dichloride;
(cyclopentadienyl)(fluorenyl)zirconium dichloride;
(cyclopentadienyl)(tetrahydroindenyl)zirconium dichloride;
(fluorenyl)(indenyl)zirconium dichloride;
bis(1-methyl-3-n-butyl-cyclopentadienyl)zirconium dichloride;
dimethylsilanediylbis(indenyl)zirconium dichloride,
dimethylsilanediylbis(2-methyl-4-phenylindenyl)zirconium dichloride,
dimethylsilanediylbis(4-naphthylindenyl)zirconium dichloride,
dimethylsilanediylbis(2-methylindenyl)zirconium dichloride,
dimethylsilanediylbis(2-methyl-4-t-butylindenyl)zirconium dichloride,
dimethylsilanediylbis(2-methyl-4-isopropylindenyl)zirconium dichloride,
dimethylsilanediylbis(2,4-dimethylindenyl)zirconium dichloride,
dimethylsilanediylbis(2-methyl-4,5-benzoindenyl)zirconium dichloride,
dimethylsilanediylbis(2,4,7-trimethylindenyl)zirconium dichloride,
dimethylsilanediylbis(2,4,6-trimethylindenyl)zirconium dichloride,
dimethylsilanediylbis(2,5,6-trimethylindenyl)zirconium dichloride,
methyl(phenyl)silanediylbis(2-methyl-4,6-diisopropylindenyl)-zirconium dichloride,
methyl(phenyl)silanediylbis(2-methyl-4-isopropylindenyl)-zirconium dichloride,
1,2-ethylenebis(indenyl)zirconium dichloride,
1,2-ethylenebis(4,7-dimethylindenyl)zirconium dichloride,
1,2-ethylenebis(2-methyl-4-phenylindenyl)zirconium dichloride,
1,4-butanediylbis(2-methyl-4-phenylindenyl)zirconium dichloride, 1,2-ethylenebis(2-methyl-4,6-diisopropylindenyl)zirconium dichloride,
1,4-butanediylbis(2-methyl-4-isopropylindenyl)zirconium dichloride,
1,4-butanediylbis(2-methyl-4,5-benzoindenyl)zirconium dichloride,
1,2-ethylenebis(2-methyl-4,5-benzoindenyl)zirconium dichloride,
[4-($\eta^5$-cyclopentadienyl)-4,6,6-trimethyl($\eta^5$-4,5-tetrahydropentalene)]dimethylzirconium,
[4-($\eta^5$-3'-trimethylsilylcyclopentadienyl)-4,6,6-trimethyl($\eta^5$-4,5-tetrahydropentalene)]dimethylzirconium,
(tert-butylamido)(tetramethyl-$\eta^5$-cyclopentadienyl)-1,2-ethane-dimethyltitanium,
(methylamido)(tetramethyl-$\eta^5$-cyclopentadienyl)dimethylsilyl-dimethyltitanium,
(methylamido)(tetramethyl-$\eta^5$-cyclopentadienyl)-1,2-ethanediyl-dimethyltitanium,
(tertbutylamido)-(2,4-dichloride-2,4-pentadien-1-yl)dimethylsilyl-dimethyltitanium,
bis(1,3-dimethylcyclopentadienyl)zirconium dichloride,
methylene(3-methyl-cyclopentadienyl)-7-(2,5-dimethylcyclopentadienyl-[1,2-b:4,3-b']dithiophene)zirconium dichloride;
methylene(3-isopropyl-cyclopentadienyl)-7-(2,5-dimethylcyclopentadienyl-[1,2-b:4,3-b']dithiophene)zirconium dichloride;
methylene(2,4-dichloride-cyclopentadienyl)-7-(2,5-dimethylcyclopentadienyl-[1,2-b:4,3-b']dithiophene)zirconium dichloride;
methylene(2,3,5-trimethyl-cyclopentadienyl)-7-(2,5-dimethylcyclopentadienyl-[1,2-b:4,3-b']dithiophene)zirconium dichloride;
methylene-1-(indenyl)-7-(2,5-dimethylcyclopentadienyl-[1,2-b:4,3-b']dithiophene)zirconium dichloride and dichloride;
methylene-1-(indenyl)-7-(2,5-ditrimethylsilylcyclopentadienyl-[1,2-b:4,3-b']dithiophene)zirconium dichloride;
methylene-1-(3-isopropyl-indenyl)-7-(2,5-dimethylcyclopentadienyl-[1,2-b:4,3-b']dithiophene)zirconium dichloride;
methylene-1-(2-methyl-indenyl)-7-(2,5-dimethylcyclopentadienyl-[1,2-b:4,3-b']dithiophene)zirconium dichloride;
methylene-1-(tetrahydroindenyl)-7-(2,5-dimethylcyclopentadienyl-[1,2-b:4,3-b']dithiophene)zirconium dichloride;
methylene(2,4-dichloride-cyclopentadienyl)-7-(2,5-dimethylcyclopentadienyl-[1,2-b:4,3-b']dioxazol)zirconium dichloride;
methylene(2,3,5-trimethyl-cyclopentadienyl)-7-(2,5-dimethylcyclopentadienyl-[1,2-b:4,3-b']dioxazol)zirconium dichloride;
methylene-1-(indenyl)-7-(2,5-dimethylcyclopentadienyl-[1,2-b:4,3-b']dioxazol)zirconium dichloride and dichloride;
isopropylidene(3-methyl-cyclopentadienyl)-7-(2,5-dimethylcyclopentadienyl-[1,2-b:4,3-b']dithiophene)zirconium dichloride;
isopropylidene(2,4-dichloride-cyclopentadienyl)-7-(2,5-dimethylcyclopentadienyl-[1,2-b:4,3-b']dithiophene)zirconium dichloride;
isopropylidene(2,4-diethyl-cyclopentadienyl)-7-(2,5-dimethylcyclopentadienyl-[1,2-b:4,3-b']dithiophene)zirconium dichloride;
isopropylidene(2,3,5-trimethyl-cyclopentadienyl)-7-(2,5-dimethylcyclopentadienyl-[1,2-b:4,3-b']dithiophene)zirconium dichloride;
isopropylidene-1-(indenyl)-7-(2,5-dimethylcyclopentadienyl-[1,2-b:4,3-b']dithiophene)zirconium dichloride;
isopropylidene-1-(2-methyl-indenyl)-7-(2,5-dimethylcyclopentadienyl-[1,2-b:4,3-b']dithiophene)zirconium dichloride;
dimethylsilandiyl-1-(2-methyl-indenyl)-7-(2,5-dimethylcyclopentadienyl-[1,2-b:4,3-b']dithiophene)hafnium dichloride;
dimethylsilanediyl(3-tert-butyl-cyclopentadienyl)(9-fluorenyl)zirconium dichloride,
dimethylsilanediyl(3-isopropyl-cyclopentadienyl)(9-fluorenyl)zirconium dichloride,
dimethylsilanediyl(3-methyl-cyclopentadienyl)(9-fluorenyl)zirconium dichloride,
dimethylsilanediyl(3-ethyl-cyclopentadienyl)(9-fluorenyl)zirconium dichloride,
1-2-ethane(3-tert-butyl-cyclopentadienyl)(9-fluorenyl)zirconium dichloride,
1-2-ethane(3-isopropyl-cyclopentadienyl)(9-fluorenyl)zirconium dichloride,
1-2-ethane(3-methyl-cyclopentadienyl)(9-fluorenyl)zirconium dichloride,
1-2-ethane(3-ethyl-cyclopentadienyl)(9-fluorenyl)zirconium dichloride,
dimethylsilandiylbis-6-(3-methylcyclopentadienyl-[1,2-b]-thiophene) dichloride;
dimethylsilandiylbis-6-(4-methylcyclopentadienyl-[1,2-b]-thiophene)zirconium dichloride;
dimethylsilandiylbis-6-(4-isopropylcyclopentadienyl-[1,2-b]-thiophene)zirconium dichloride;
dimethylsilandiylbis-6-(4-ter-butylcyclopentadienyl-[1,2-b]-thiophene)zirconium dichloride;
dimethylsilandiylbis-6-(3-isopropylcyclopentadienyl-[1,2-b]-thiophene)zirconium dichloride;
dimethylsilandiylbis-6-(3-phenylcyclopentadienyl-[1,2-b]-thiophene)zirconium dichloride;
dimethylsilandiylbis-6-(2,5-dichloride-3-phenylcyclopentadienyl-[1,2-b]-thiophene)zirconium dimethyl;
dimethylsilandiylbis-6-[2,5-dichloride-3-(2-methylphenyl)cyclopentadienyl-[1,2-b]-thiophene]zirconium dichloride;
dimethylsilandiylbis-6-[2,5-dichloride-3-(2,4,6-trimethylphenyl)cyclopentadienyl-[1,2-b]-thiophene]zirconium dichloride;
dimethylsilandiylbis-6-[2,5-dichloride-3-mesitylenecyclopentadienyl-[1,2-b]-thiophene]zirconium dichloride;
dimethylsilandiylbis-6-(2,4,5-trimethyl-3-phenylcyclopentadienyl-[1,2-b]-thiophene)zirconium dichloride;
dimethylsilandiylbis-6-(2,5-diethyl-3-phenylcyclopentadienyl-[1,2-b]-thiophene)zirconium dichloride;
dimethylsilandiylbis-6-(2,5-diisopropyl-3-phenylcyclopentadienyl-[1,2-b]-thiophene)zirconium dichloride;
dimethylsilandiylbis-6-(2,5-diter-butyl-3-phenylcyclopentadienyl-[1,2-b]-thiophene)zirconium dichloride;
dimethylsilandiylbis-6-(2,5-ditrimethylsilyl-3-phenylcyclopentadienyl-[1,2-b]-thiophene)zirconium dichloride;
dimethylsilandiylbis-6-(3-methylcyclopentadienyl-[1,2-b]-silole)zirconium dichloride;
dimethylsilandiylbis-6-(3-isopropylcyclopentadienyl-[1,2-b]-silole)zirconium dichloride;
dimethylsilandiylbis-6-(3-phenylcyclopentadienyl-[1,2-b]-silole)zirconium dichloride;
dimethylsilandiylbis-6-(2,5-dichloride-3-phenylcyclopentadienyl-[1,2-b]-silole)zirconium dichloride;
dimethylsilandiylbis-6-[2,5-dichloride-3-(2-methylphenyl)cyclopentadienyl-[1,2-b]-silole]zirconium dichloride;
dimethylsilandiylbis-6-[2,5-dichloride-3-(2,4,6-trimethylphenyl)cyclopentadienyl-[1,2-b]-silole]zirconium dichloride;

dimethylsilandiylbis-6-[2,5-dichloride-3-mesitylenecyclopentadienyl-[1,2-b]-silole]zirconium dichloride;
dimethylsilandiylbis-6-(2,4,5-trimethyl-3-phenylcyclopentadienyl-[1,2-b]-silole)zirconium dichloride;
[dimethylsilyl(tert-butylamido)][tetramethylpentadienyl]titanium dichloride;
[dimethylsilyl(tert-butylamido)][1-indenyl]titanium dichloride;
[dimethylsilyl(tert-butylamido)][9-fluorenyl]titanium dichloride;
[dimethylsilyl(tert-butylamido)][(N-methyl-1,2-dihydrocyclopenta[2,1-b]indol-2-yl)]titanium dichloride;
[dimethylsilyl(tert-butylamido)][(6-methyl-N-methyl-1,2-dihydrocyclopenta[2,1-b]indol-2-yl)]titanium dichloride;
[dimethylsilyl(tert-butylamido)][(6-methoxy-N-methyl-1,2-dihydrocyclopenta[2,1-b]indol-2-yl)]titanium dichloride;
[dimethylsilyl(tert-butylamido)][(N-ethyl-1,2-dihydrocyclopenta[2,1-b]indol-2-yl)]titanium dichloride;
[dimethylsilyl(tert-butylamido)][(N-phenyl-1,2-dihydrocyclopenta[2,1-b]indol2-yl)]titanium dichloride;
[dimethylsilyl(tert-butylamido)][(6-methyl-N-phenyl-1,2-dihydrocyclopenta[2,1-b]indol2-yl)]titanium dichloride;
[dimethylsilyl(tert-butylamido)][(6-methoxy-N-phenyl-1,2-dihydrocyclopenta[2,1-b]indol-2-yl)]titanium dichloride;
[dimethylsilyl(tert-butylamido)][(N-methyl-3,4-dichloride-1,2-dihydrocyclopenta[2,1-b]indol-2-yl)]titanium dichloride;
[dimethylsilyl(tert-butylamido)][(N-ethyl-3,4-dichloride-1,2-dihydrocyclopenta[2,1-b]indol-2-yl)]titanium dichloride;
[dimethylsilyl(tert-butylamido)][(N-phenyl-3,4-dichloride-1,2-dihydroclopenta[2,1-b]indol-2-yl)]titanium dichloride;
Dimethylsilandiylbis(2-methyl-4-p-tert-butylphenylindenyl)zirconium dichloride;
Dimethylsilandiyl(2-isopropyl-4-p-tert-butylphenylindenyl)(2-methyl-4-p-tert-butylphenylindenyl)zirconium dichloride;
Dimethylsilandiyl(2-isopropyl-4-p-tert-butylphenylindenyl)(2-methyl-4-p-tert-butyl-7-methylphenylindenyl)zirconium dichloride;
as well as the corresponding zirconium dimethyl, hydrochloro dihydro and $\eta^4$-butadiene compounds.

Suitable metallocene complexes belonging to formulas (I), (II) or (III) are described in WO 98/22486, WO 99/58539, WO 99/24446, U.S. Pat. No. 5,556,928, WO 96/22995, EP-485822, EP-485820, U.S. Pat. No. 5,324,800, EP-A-0 129 368, U.S. Pat. No. 5,145,819, EP-A-0 485 823, WO 01/47939, WO 01/44318, PCT/EP02/13552, EP-A-0 416 815, EP-A-0 420 436, EP-A-0 671 404, EP-A-0 643 066 and WO-A-91/04257.

These compounds are usually used in conjunction with an alumoxane or a compound able to give an alkylmetallocene cation.

The alumoxanes used in the catalyst according to the invention are considered to be linear, branched or cyclic compounds containing at least one group of the type:

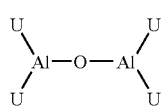

wherein the substituents U, same or different, are defined above.

In particular, alumoxanes of the formula:

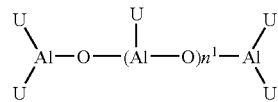

can be used in the case of linear compounds, wherein $n^1$ is 0 or an integer of from 1 to 40 and the substituents U are defined as above; or alumoxanes of the formula:

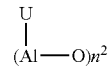

can be used in the case of cyclic compounds, wherein $n^2$ is an integer from 2 to 40 and the U substituents are defined as above.

Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO).

Particularly interesting cocatalysts are those described in WO 99/21899 and in WO01/21674 in which the alkyl and aryl groups have specific branched patterns.

Non-limiting examples of aluminium compounds that can be reacted with water to give suitable alumoxanes described in WO 99/21899 and WO01/21674, are: tris(2,3,3-trimethyl-butyl)aluminium, tris(2,3-dimethyl-hexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl)aluminium, tris(2-ethyl-3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl)aluminium, tris(2-isobutyl-3-methyl-pentyl)aluminium, tris(2,3,3-trimethyl-pentyl)aluminium, tris(2,3,3-trimethyl-hexyl)aluminium, tris(2-ethyl-3,3-dimethyl-butyl)aluminium, tris(2-ethyl-3,3-dimethyl-pentyl)aluminium, tris(2-isopropyl-3,3-dimethyl-butyl)aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluoro-phenyl)-propyl]aluminium, tris[2-(4-chloro-phenyl)-propyl]aluminium, tris[2-(3-isopropyl-phenyl)-propyl]aluminium, tris(2-phenyl-butyl)aluminium, tris(3-methyl-2-phenyl-butyl)aluminium, tris(2-phenyl-pentyl)aluminium, tris[2-(pentafluorophenyl)-propyl]aluminium, tris[2,2-diphenyl-ethyl]aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Amongst the above aluminium compounds, trimethylaluminium (TMA), triisobutylaluminium (TIBA), tris(2,4,4-trimethyl-pentyl)aluminium (TIOA), tris(2,3-dimethylbutyl) aluminium (TDMBA) and tris(2,3,3-trimethylbutyl) aluminium (TTMBA) are preferred.

Non-limiting examples of compounds able to form an alkylnetallocene cation are compounds of formula $D^+E^-$, wherein D⁺ is a Brønsted acid, able to donate a proton and to react irreversibly with a subsistent X of the metallocene of formula (1) and E⁻ is a compatible anion, which is able to stabilize the active catalytic species originating from the reaction of the two compounds, and which is sufficiently labile to be removed by an olefinic monomer. Preferably, the anion E⁻ comprises one or more boron atoms. More preferably, the anion E⁻ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred compound, as described in WO 91/02012. Moreover, compounds of formula $BAr_3$ can be conveniently used. Compounds of this type are described, for example, in the International patent application WO 92/00333. Other examples of compounds able to form an alkylnetallocene cation are compounds of formula $BAr_3P$ wherein P is a substituted or unsubstituted pyrrol radical. These compounds are described in WO01/62764. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula D⁺E⁻ are:
Triethylammoniumtetra(phenyl)borate,
Tributylammoniumtetra(phenyl)borate,
Trimethylammoniumtetra(tolyl)borate,
Tributylammoniumtetra(tolyl)borate,
Tributylammoniumtetra(pentafluorophenyl)borate,
Tributylammoniumtetra(pentafluorophenyl)aluminate,
Tripropylammoniumtetra(dimethylphenyl)borate,
Tributylammoniumtetra(trifluoromethylphenyl)borate,
Tributylammoniumtetra(4-fluorophenyl)borate,
N,N-Dimethylbenzylammonium-tetrakispentafluorophenylborate,
N,N-Dimethylhexylamonium-tetrakispentafluorophenylborate,
N,N-Dimethylaniliniumtetra(phenyl)borate,
N,N-Diethylaniliniumtetra(phenyl)borate,
N,N-Dimethylaniliniumtetrakis(pentafluorophenyl)borate,
N,N-Dimethylaniliniumtetrakis(pentafluorophenyl)aluminate,
N,N-Dimethylbenzylammonium-tetrakispentafluorophenylborate,
N,N-Dimethylhexylamonium-tetrakispentafluorophenylborate,
Di(propyl)ammoniumtetrakis(pentafluorophenyl)borate,
Di(cyclohexyl)ammoniumtetrakis(pentafluorophenyl)borate,
Triphenylphosphoniumtetrakis(phenyl)borate,
Triethylphosphoniumtetrakis(phenyl)borate,
Diphenylphosphoniumtetrakis(phenyl)borate,
Tri(methylphenyl)phosphoniumtetrakis(phenyl)borate,
Tri(dimethylphenyl)phosphoniumtetrakis(phenyl)borate,
Triphenylcarbeniumtetrakis(pentafluorophenyl)borate,
Triphenylcarbeniumtetrakis(pentafluorophenyl)aluminate,
Triphenylcarbeniumtetrakis(phenyl)aluminate,
Ferroceniumtetrakis(pentafluorophenyl)borate,
Ferroceniumtetrakis(pentafluorophenyl)alurinate.
Triphenylcarbeniumtetrakis(pentafluorophenyl)borate, and
N,N-Dimethylaniliniumtetrakis(pentafluorophenyl)borate.

With the composition of the present invention it is possible to obtain a final material having an enhanced impact-stiffness balance with respect the similar composition of the prior art.

The following examples are given to illustrate and not to limit the invention.

Experimental Section
General Procedure
The Intrinsic Viscosity

The intrinsic viscosity (IV) was measured in tetrahydronaphtalene (THN) at 135° C.

Fraction Soluble in Xylene at 25° C. (XSRT)

2 g of polymer are dissolved in 250 ml of xylene at 135° C., while agitating. After 20 minutes the solution is left to cool, still under agitation, until it reaches 25° C. After 30 minutes the precipitated material is filtered through filter paper, the solution is evaporated in nitrogen current and the residual is dried under vacuum at 80° C. until it reaches constant weight. Thus the percentage of polymer soluble in xylene at 25° C. is calculated.

Melt Flow Rate

Melt Flow Rate (MFR) was measured according to ASTM D1238-230° C.; 2.16 kg

Determination of the 2,1 Regioerrors:

2,1 regioerrors were determined by means of $C^{13}$-NMR spectra recorded at a Varian 300 MHz instrument according to the methodology described by J. C. Randall in "Polymer sequence determination Carbon 13 NMR method", Academic Press 1977. The content of regioinvertions is calculated on the basis of the relative concentration of $S_{\alpha\beta}+S_{\beta\beta}$ methylene sequences.

Effective Density

Density was measured according to ASTM-D 792

Enthalpy of Fusion

Enthalpy of fusion was determined with a differential scanning calorimetry (DSC) were carried out on an instrument DSC 2920 from TA Instruments, according to the following procedure. About 5 mg of sample is equilibrated at −20° C. for 5 min., then the temperature is ramped up at 10° C./min to 235 C, and held for 3 min under nitrogen. The temperature is then ramped down at 10° C./min to −20° C. and held for 5 min. The temperature is then ramped up again for a second heat at 10° C./min to 235° C. The values reported are those obtained in the first scan.

Monomer Contents

Monomer contents were determined by using $C^{13}$-NMR spectra.

Determination of Polydispersity Index (PI)

This property is strictly connected with the molecular weight distribution of the polymer under examination. In particular it is inversely proportional to the creep resistance of the polymer in the molten state. Said resistance called modulus separation at low modulus value (500 Pa), was determined at a temperature of 200° C. by using a parallel plates rheometer model RMS-800 marketed by RHEOMETRICS (USA), operating at an oscillation frequency which increases from 0.1 rad/sec to 100 rad/sec. From the modulus separation value, one can derive the P.I. by way of the equation:

$$P.I.=54.6*(modulus\ separation)^{-1.76}$$

in which the modulus separation is defined as:

modulus separation=frequency at G'=500 Pa/frequency at G''=500 Pa wherein G' is storage modulus and G'' is the loss modulus.

Determination of r1×r2 Reactivity Ratios r1×r2 reactivity ratios were determined by means of $C^{13}$-NMR spectra recorded at a Varian 300 MHz instrument. For component b) r1×r2 were determined according to the following formula $$r1\times r2=4[EE]\cdot[OO]/[EO]^2$$

wherein [EE] and [OO] represent the mole fractions of the ethylene units and the 1.octene units, respectively, in the ethylene copolymer and [EO] is a proportion of number of ethylene/1-octene alternating chains in the total number of dyad chains.

For component c) r1×r2 were determined according to the following formula $$r1 \times r2 = 4[PP] \cdot [EE]/[PE]^2$$

wherein [PP] and [EE] represent the mole fractions of the propylene units and the ethylene units, respectively, in the propylene/ethylene copolymer and [PE] is a proportion of number of propylene/ethylene alternating chains in the total number of dyad chains.

Assignments of the diads were made according to M. Kakugo, Y. Naito, K. Mizunuma, Macromolecules 1982, 15, 1150-1152 and J. C. Randall JMS-REV. Macromol. Chem. Phys., C29 (2&3), 201-317 (1989).

Components of the Composition

Component a)

Component a-1) was obtained according to run 4 of EP 03102001.9 component a-2) was obtained according to Example 1 of EP728769 with an hydrogen concentration of about 3.4 Nl.

component a-3) was obtained as described in example 5 of EP728769, using Cyclohexylmethyldimethoxysilane instead of 9,9-bis-(methoxymethyl)fluorene, 75° as polymerization temperature and 3350 ppm hydrogen in the feed.

The features of components a) are reported in table 1.

TABLE 1

| Comp | PI | MFR dg/min | XSRT % | 2,1 regioerrors % |
|---|---|---|---|---|
| a-1 | 2.4 | 50 | 0.6 | present |
| a-2 | 3.8 | 60 | 3.8 | n.d. |
| a-3 | 5 | 63 | 2 | n.d. | n.d. not detectable

Component b)

Component b) was an ethylene/1-octene copolymer sold by DuPont Dow elastomers with the trademark Engage® 8180 having the following features:

| | |
|---|---|
| Ethylene content (NMR) | 85.7% by mol |
| 1-octene content (NMR) | 14.3% by mol |
| intrinsic viscosity | 2.1 dL/g |
| density | 0.863 g/cm³ |
| r1 × r2 | 3.637 |
| enthalpy of fusion | 21.5 J/g |

Component c)

component c) was obtained according to the following procedure by using rac-dimethylsilanediyl(2-methyl-4-(4'-tert-butylphenyl)indenyl)(2-isopropyl-4-(4'-tetr-butylphenyl)indenyl)zirconium dichloride (A-1) as metallocene catalyst component prepared according to the procedure described in WO 01/48034.

Polymerizations were conducted in a 1 gallon stainless steel autoclave. The autoclave was swept with dry argon at 90° C. for 1 h prior to polymerization. 2 mg of the metallocene compound described above was dissolved in 50 ml of a 7 wt % hexane solution of MAO, shaken for 10 minutes, and added to the reactor at 15° C. 12000 g of a mixture propylene/propane, with 12.5% by weight of propylene, were added to the reactor. The reactor was thermostated at 40° C., and ethylene overpressure was added. The zirconocene/MAO solution was then charged to the reactor through a stainless steel tube using a controlled amount of argon gas pressure. The reactor and contents were heated to 60° C. while ethylene was fed on demand (50 g. of ethylene were feed) with a mass flow controller to maintain the desired reactor overpressure. Constant overpressure was maintained throughout the run. Carbon monoxide gas was charged to the reactor 2 h after reaching polymerization temperature and the residual monomer was vented while cooling the reactor to room temperature. The polymer was removed and dried in a vacuum oven at 50° C. for 1 h. The features of the propylene copolymer obtained are reported in table 2.

TABLE 2

| ethylene content % mol | IV dL/g | density gm/cm³ | r1 × r2 | enthalpy of fusion J/g |
|---|---|---|---|---|
| 30.7 | 2.23 | 0.87 | 1.52 | 16.3 |

Preparation of Compositions General Procedure

To all samples 0.2 parts by weight per 100 parts by weight polymer of A.O. B-225 (an antioxidant consisting of 50% Irgafos 168 and 50% Irganox 1010) and 0.1 parts by weight per 100 parts by weight polymer of calcium stearate were added.

Samples were prepared by tumble blending about 5 lbs total weight by hand in a plastic bag. Then the samples were pelletized using a 25 mm Berstorff twin screw extruder with screw 25-09 (a low shear type), a feed rate of 50, at 280 RPM, and 350 F feed temperature setting increasing to 400 F at the die. Injection molded specimens were made using the ISO test bar mold for flex and Izod and molded per ISO 1873-2.

Chord modulus, Izod impact, and tensile strength were measured according to ISO methods. The properties of the compositions are reported in table 3.

TABLE 3

| | Ex 1* | Ex 2 | Ex 3* | Ex 4 | Ex 5 |
|---|---|---|---|---|---|
| component a) | | | | | |
| a-1 | 70% | | 80% | | |
| a-2 | | 70% | | 80% | |
| a-3 | | | | | 80 |
| component b) | 20% | 20% | 13.33 | 13.33 | 13.33 |
| component c) | 10% | 10% | 6.67 | 6.67 | 6.67 |
| ratio b)/b) + c) | 0.66 | 0.66 | 0.66 | 0.66 | 0.66 |
| MFR, 2.16 Kg, @ 230 C. dg/min | 21 | 20 | 30 | 31 | 18 |
| young modulus (MPa) | 859 | 972 | 1083 | 1265 | 1340 |
| tensile strength at yields (MPa) | 17.2 | 18.3 | 21 | 23 | 21.7 |
| % elongation at yield | 10.8 | 10 | 9.7 | 8.7 | 6.5 |
| tensile strength at break (MPa) | 13 | 14.4 | 14.7 | 13.8 | 16.4 |
| % elongation at break | >440 | >440 | >440 | >440 | 155 |
| chord modulus 1% sec (MPa) | 641 | 728 | 804 | 943 | 1117 |
| Izod −30 C., KJ/m² | 5.7 | 6.7 | 2.8 | 3.5 | 5.3 |
| Izod −40 C., KJ/m² | 4.9 | 5.5 | 2.7 | 3.5 | 4.8 |

*comparative examples

From table 4 it clearly results that the examples according to the invention show an improved impact-stiffness balance of properties.

The invention claimed is:

1. A propylene polymer composition comprising components:

a) from 50% to 90% by weight of a propylene homopolymer or a propylene copolymer containing up to 5% by mol of derived units of $C_2$-$C_{20}$ alpha-olefins, produced with a Ziegler Natta catalyst, comprising:

(i) a polydispersity index greater than 3.5;

(ii) a melt flow rate, as measured at 230° C. under a load of 2.16 kg, greater than 1 dg/min;

(iii) a fraction soluble in xylene at 25° C. greater than >1%; and (iv) no detectable 2,1 regioerrors in a $^{13}C$ NMR spectrum recorded at a 300 MHz instrument;

b) from 5% to 25% by weight of a copolymer of ethylene and 1-octene comprising:

(i) a content of $C_8$ derived units from 10% to 30% by mol;

(ii) an intrinsic viscosity higher than 1.2 dL/g and lower than 6 dL/g;

(iii) a density ranging from 0.850 to 0.890 g/cm$^3$; and (iv) a crystallinity content, expressed as an enthalpy of fusion, lower than 62 J/g;

(v) a product of reactivity ratio r1×r2 lower than 5; and c) from 5% to 25% by weight of a copolymer of propylene and ethylene comprising:

(i) a content of propylene derived units higher than 50% by mol and lower than 92% by mol;

(ii) an intrinsic viscosity higher than 2 dL/g and lower than 6 dL/g;

(iii) a density ranging from 0.850 to 0.890 g/cm$^3$;

(iv) a value of a product of reactivity ratios r1×r2 lower than 2; and (v) a crystallinity content, expressed as an enthalpy of fusion, lower than 45 J/g, wherein a weight ratio between component b) and the sum of component b) and component c) is equal to or higher than 0.5 and less than or equal to 0.9, and wherein components b) and c) are obtained by a process comprising at least one metallocene compound of formula (I) or (II):

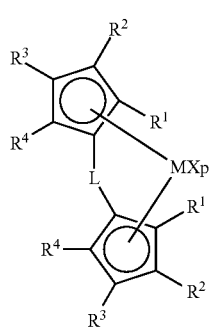

(I)

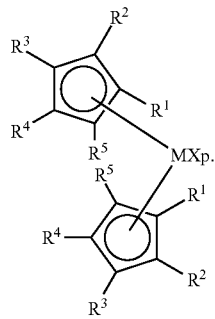

(II)

wherein

M is a transition metal belonging to group 4, 5 or to the lanthanide or actinide groups of the Periodic Table of Elements;

X, equal to or different from each other, are monoanionic sigma ligands selected from the group consisting of hydrogen, halogen, $R^6$, $OR^6$, $OCOR^6$, $SR^6$, $NR^6_2$ and $PR^6_2$, or two X can optionally form a substituted or unsubstituted butadienyl radical or a OR'O group;

R' is a divalent radical selected from $C_1$-$C_{20}$ alkylidene, $C_6$-$C_{40}$ arylidene, $C_7$-$C_{40}$ alkylarylidene and $C_7$-$C_{40}$ arylalkylidene radicals;

$R^6$ is a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl group, and optionally comprise at least one Si or Ge atom;

p is an integer equal to the oxidation state of M minus 2;

L is a divalent bridging group selected from $C_1$-$C_{20}$ alkylidene, $C_3$-$C_{20}$ cycloalkylidene, $C_6$-$C_{20}$ arylidene, $C_7$-$C_{20}$ alkylarylidene, or $C_7$-$C_{20}$ arylalkylidene radicals optionally comprising at least one heteroatom belonging to groups 13-17 of the Periodic Table of Elements, and silylidene radicals comprising up to 5 silicon atoms such as $SiMe_2$, $SiPh_2$; and $R^1$, $R^2$, $R^3$, $R^4$ and $R^5$, equal to or different from each other, are hydrogen, halogen, or linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl, or $C_7$-$C_{20}$-arylalkyl radicals, optionally comprising at least one heteroatom belonging to groups 13-17 of the Periodic Table of Elements; or two adjacent $R^1$, $R^2$, $R^3$, $R^4$ and $R^5$ form at least one substituted or unsubstituted 3-7 membered ring optionally comprising at least one heteroatom belonging to groups 13-17 of the Periodic Table of Elements, the substituted or unsubstituted 3-7 membered ring forming with the cyclopentadienyl moiety radicals selected from indenyl; mono-, di-, tri- and tetra-methyl indenyl; 2-methyl-4-(4'-tert-butylphenyl)indenyl; 2-isopropyl-4-(4'-tert-butylphenyl)indenyl; 2-methyl indenyl; 3-t-butyl-indenyl; 2-isopropyli-4-phenyl indenyl; 2-methyl-4-phenyl indenyl; 2-methyl-4,5benzo indenyl; 3-trimethylsilyl-indenyl; 4,5,6,7-tetrahydroindenyl; fluorenyl; 5,10-dihydroindeno[1,2-b]indol-10-yl; N-methyl- or N-phenyl-5,10-dihydroindeno[1,2-b]indol-10-yl; 5,6-dihydroindeno[2,1-b]indol-6-yl; N-methyl- or N-phenyl-5,6-dihydroindeno[2,1-b]indol-6-yl; azapentalene-4-yl; thiapentalene-4-yl; azapentalene-6-yl; thiapentalene-6-yl; mono-, di- and tri-methyl-azapentalene-4-yl; or 2,5-dimethyl-cyclopenta[1,2-b:4,3-b']-dithiophene.

2. The propylene polymer composition according to claim 1, wherein component a) ranges from 50% to 80% by weight, component b) ranges from 25% to 9% by weight, and component c) ranges from 25% to 11% by weight.

3. The propylene polymer composition according to claim 1, wherein the intrinsic viscosity of component b) is higher than 1.25 dL/g and lower than 3.0 dL/g.

4. The propylene polymer composition according to claim 1, wherein the enthalpy of fusion of component b) is lower than 50 J/g.

5. The propylene polymer composition according to claim 1, wherein component c) comprises from 50% to 80% by mol of propylene derived units, and from 50% to 20% by mol of ethylene derived units.

6. The propylene polymer composition according to claim 1, wherein the intrinsic viscosity of component c) is preferably higher than 2 dL/g and lower than 4 dL/g.

7. The propylene polymer composition according to claim 1, wherein the value of a product of reactivity ratios r1×r2 of component c) is lower than 1.8.

8. The propylene polymer composition according to claim 1, wherein the enthalpy of fusion of component c) is lower than 35 J/g.

9. The propylene polymer composition according to claim 1, wherein the polydispersity index of component a) is greater than 4.

10. The propylene polymer composition according to claim 1, wherein the at least one metallocene compound is rac-dimethylsilanediyl(2-methyl-4-(4'-tert-butylphenyl)indenyl)(2-isopropyl-4-(4'-tert-butylphenyl)indenyl)zirconium dichloride.

* * * * *